United States Patent
Singla et al.

(10) Patent No.: US 7,839,779 B2
(45) Date of Patent: Nov. 23, 2010

(54) QUEUE AWARE FLOW CONTROL

(75) Inventors: Ankur Singla, San Jose, CA (US); Harshad Nakil, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1011 days.

(21) Appl. No.: 11/130,700

(22) Filed: May 16, 2005

(65) Prior Publication Data

US 2006/0268709 A1 Nov. 30, 2006

(51) Int. Cl.
*H04L 1/00* (2006.01)
*H04L 12/26* (2006.01)
(52) U.S. Cl. ............... 370/230.1; 370/229; 370/232; 370/233; 370/230
(58) Field of Classification Search ......... 370/229–230, 370/230.1, 231–235, 235.1, 236, 236.1–236.2, 370/237–238, 238.1, 239–240
See application file for complete search history.

(56) References Cited

U.S. PATENT DOCUMENTS

| | | | | |
|---|---|---|---|---|
| 6,026,075 A | * | 2/2000 | Linville et al. | 370/236 |
| 6,167,029 A | * | 12/2000 | Ramakrishnan | 370/235 |
| 7,062,568 B1 | * | 6/2006 | Senevirathne et al. | 709/234 |
| 2002/0087723 A1 | | 7/2002 | Williams et al. | |
| 2003/0046458 A1 | | 3/2003 | Morishima | |

OTHER PUBLICATIONS

"Carrier sense multiple access with collision detection (CSMA/CD) access method and physical layer specifications",1998, IEEE Std. 802.3, IEEE, pages all.*
"Carrier sense multiple access with collision detection (CSMA/CD) access method and physical layer specifications: Annex 31B Mac Control Pause Operation",1998, IEEE Sd. 802.3, IEEE, pp. 1206-1215.*
Minasi, "Interrupts made easy. (computer hardware interrupts)", Feb. 1993, Compute! Issue 149.*
Modelware, Inc. nAccess Gigabit Ethernet MAC, Product Brief, NA-GMAC v1.1, Modelware, Inc., Internet address: www.modelware.com.
Ray Weiss, Backplane Switch-Fabric ICs Go to the Next Level, ED Online ID #1627 Mar. 18, 2002, copyright 2004 Penton Media Inc., downloaded from the Internet: <http://www.elecdesign.com/Articles/Print.cfm?ArticleID=1627>.
Clark, Tom, Storage Networking Building Blocks, informit network, Mar. 8, 2002, copyright 2008 Pearson Education, Inc. Informit, Indianapolis, Indiana, downloaded from the Internet : <http://www.informit.com/articles/article.aspx?p=25863>.

* cited by examiner

*Primary Examiner*—Kwang B Yao
*Assistant Examiner*—Adam Duda
(74) *Attorney, Agent, or Firm*—Charles E. Krueger

(57) ABSTRACT

A network flow control system utilizes flow-aware pause frames that identify a specific virtual stream to pause. Special codes may be utilized to interrupt a frame being transmitted to insert a pause frame without waiting for frame boundaries.

7 Claims, 4 Drawing Sheets

QUEUE AWARE FLOW CONTROL

BACKGROUND OF THE INVENTION

A router or switch (network device) directs packets from an input to an output. The classic network device architecture includes multiple line cards having onboard queue managers, that connect to a central switching mechanism. FIG. 1 is a high level depiction of a network device 10 depicting line cards 12 connected to a crossbar switch 14 by serial links 16. The crossbar includes crossbar switches in the form of ASICs coupled to a backplane formed of multiple serial links. The line cards act as the inputs and outputs of the router and are coupled to a backplane switching fabric which performs the task of coupling an input line card to an output line card for data transfer. Traffic from the input line card is passed through a switch the backplane switching fabric and passed to the proper output line card. High speed network device applications utilize a serial backplane where data is transferred on high-speed serial paths formed in the backplane.

The queue managers must implement flow control to prevent data from being lost when buffers on a receiver overflow. Backpressure is used to control flow and the receiver has the ability to prevent transmission of data until its buffers have capacity to receive more data.

At the transmitter, head of line (HOL) blocking may occur when a packet at the head of the transmit queue can't be transmitted because of backpressure. This blocks all packets in the transmit queue from being transmitted even if their intended receiver is available.

The problem of HOL blocking is solved by forming virtual output queues (VOQs) on the line cards where a VOQ is established for each potential receiver. Thus, if the head packet on a VOQ is blocked the line card can switch to another VOQ having a head packet that is not blocked.

The backplane interconnect architecture is a key chokepoint in today's communication infrastructure designs. A great deal of attention has been paid to moving data between chips on a board and there has been growing acceptance of Gigabit and Multi-Gigabit Ethernet as a point to point switched interconnect technology.

Flow Control is a process that is found in most Ethernet networks. It is needed to ensure that devices do not overload other devices on the network. Special frames called 'PAUSE frames' are used to signal traffic flow requests and status between nodes. PAUSE frames permit one end station to temporarily stop all traffic from the other end station (except MAC Control frames).

For example, assume a full-duplex link that connects two devices called "Station A" and "Station B". Suppose Station A transmits frames at a rate that causes Station B to enter into a state of congestion (i.e. no buffer space remaining to receive additional frames). Station B may transmit a PAUSE frame to Station A requesting that Station A stop transmitting frames for a specified period of time. Upon receiving the PAUSE frame, Station A will suspend further frame transmission until the specified time period has elapsed. This will allow Station B time to recover from the congestion state. At the end of the specified time period, Station A will resume normal transmission of frames.

Note that the PAUSE frame protocol is bi-directional. Station A may send frames to pause Station B, and Station B may send frames to pause Station A. A PAUSE frame is the one type of frame that a station is allowed to send even if it is currently in the paused state. Support for PAUSE frames is optional among devices that implement the full-duplex protocol (the use of PAUSE frames is not supported in a half-duplex environment). It is valid for a device to support only half of the protocol; i.e. it may transmit PAUSE frames without having the capability to decode them on the receive side, and vice-versa. Devices use the Auto-Negotiation protocol to discover the PAUSE frame capabilities of the device at the other end of the link. This permits interoperability between devices that do or do not support one or both halves of the protocol.

However, the current flow control using PAUSE frame does not fit very well in the backplane architecture as it does not distinguish internal queues of the system and prevents traffic to flow between unclogged queues when one of the queues become full.

The problem with PAUSE frames is that the transmitting device stops all further transmissions for duration of the PAUSE event in units of 512-bit times. This works very well for devices connected over the Ethernet network in a LAN/WAN environment. However, this can become a Quality of Service (QoS) bottleneck in a backplane interconnect environment.

The challenges in the field of backplane interconnect design continue to increase with demands for more and better techniques having greater flexibility and adaptability. Therefore, a need has arisen for a new system and method for providing backpressure control in Gigabit Ethernet systems allowing for QoS and Class of Service (CoS) requirements to be met.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

A first embodiment will be described in connection with a MultiGigabit SERDES backplane for Access Routing platforms that utilize Ethernet Protocol. The use of Ethernet Protocol will help alleviate the congestion of the currently utilized PCI-based backplane and provide a low cost and low power point-to-point switched interconnect. However, the current Ethernet Flow Control protocol does not provide the required support for backplane applications.

Typically, backplanes carry traffic in many virtual streams bound for different destinations. Datagram traffic (latency insensitive) and Control traffic (latency sensitive) are examples of two virtual streams in a system. When one of the outgoing line-cards has one of its virtual streams full, the incoming virtual stream at that input port(s) of the switching node may enter a blocked state as it fills up. If a current Ethernet Media Access Controller (MAC) is used, it can cause all traffic from many line cards to stop flowing to the switching node as one of the virtual streams is blocked. This is not desirable in the backplane interconnect.

Even during heavy loading of the switched backplane, it should be possible to transport latency sensitive traffic and/or control traffic without getting head of line blocked because the traffic of one of the virtual streams is blocked. The avoidance of HOL blocking requires virtual stream aware flow control support in the Ethernet protocol.

In the following, two techniques for providing virtual stream aware flow control in the Ethernet protocol are described. Both of these techniques are novel in a way that they not only support standard Ethernet MACs but also allow for a mixed fabric of modified and standard Ethernet devices. This is especially important in access routing market where time to market dictates development of modules/line cards using off-the-shelf components.

Figure 1:
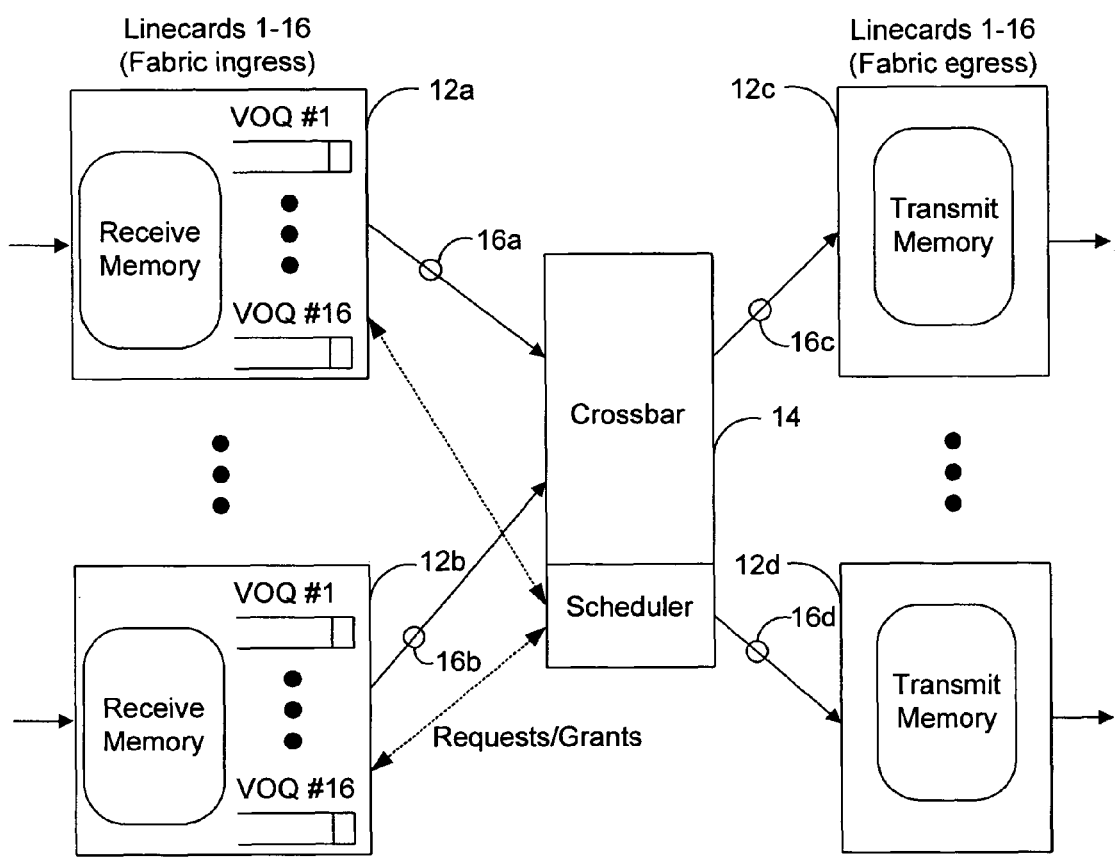
FIG. 1 is a block diagram of an example the architecture of a network device.
Figure 2:
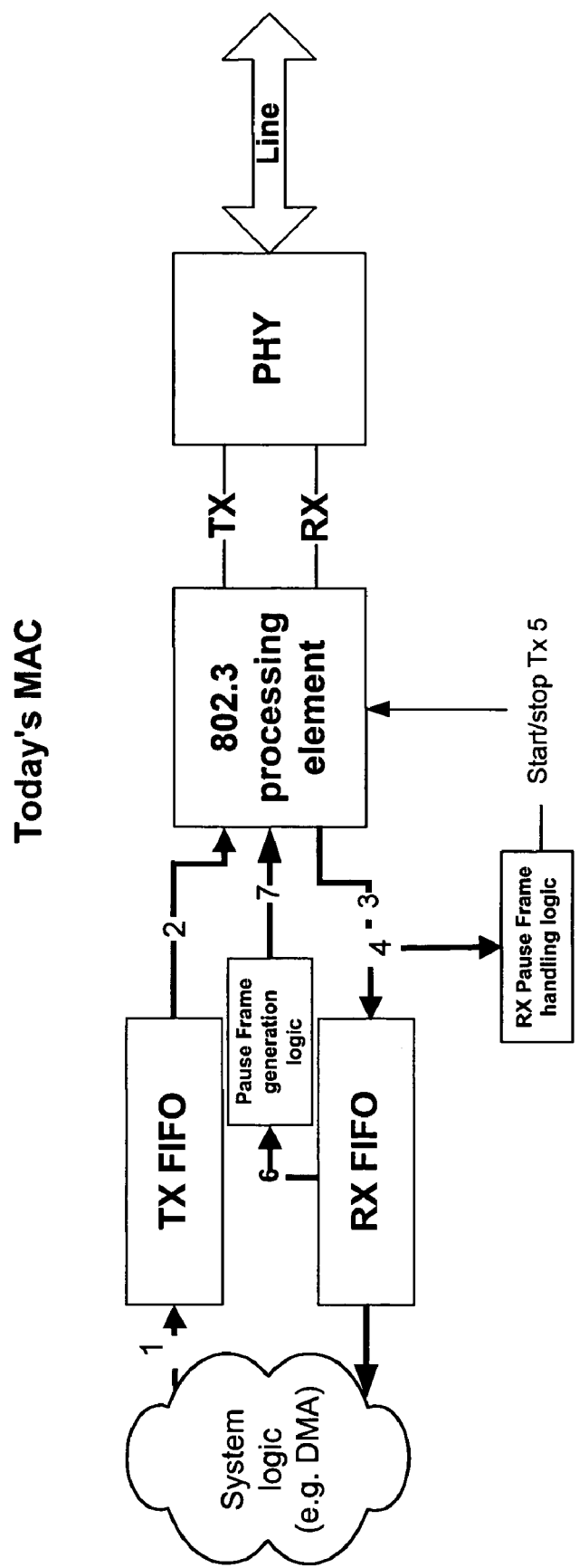
FIG. 2 is a block diagram of a conventional MAC.

FIG. 2 depicts the existing MAC system utilized in Ethernet systems in compliance with IEEE 802.3. The system includes Tx and Rx FIFOs, Pause Frame generation logic (PFGL), an 802.3 processing element, pause frame handling logic (PFHL) and a Physical Layer (PHY) device coupled to the media.

When transmitting, the system logic, e.g., a DMA or switch scheduler, puts frames for transmission in the Tx FIFO and 802.3 processing element transmits frames from the Tx FIFO to the PHY. When receiving, the 802.3 processing element receives frames into the Rx FIFO.

When the fill level of the Rx FIFO is above a programmable threshold the pause frame generation logic generates a pause frame with a programmable pause value and passes the pause frame to the 802.3 processing element for transmission to the PHY. When the fill level of the Rx FIFO is below another programmable level the pause frame generation logic generates a pause frame with a zero pause value to signal a peer device to resume transmission.

When a pause frame with a non-zero pause is received, the Rx pause frame logic informs the 802.3 processing element to stop transmission for the pause time after completing transmission of the current frame. The Rx pause frame logic informs the 802.3 processing element to resume transfers when a pause frame with a zero pause is received.

The standard 802.3x pause frame format included a Length/Type field of 16 bits that holds a value 88-08 (hex) to indicate a MAC control frame, a MAC Control Opcode of 16 bits that holds a value 00-01 to indicate that the frame is being used as a Pause Frame, and a Pause_time parameter field of 16 bits. Additionally, the Pause Frame includes a 42-byte reserved field (transmitted as all zeros) that is required to pad the length of the Pause Frame to the minimum Ethernet frame size.

Figure 3:
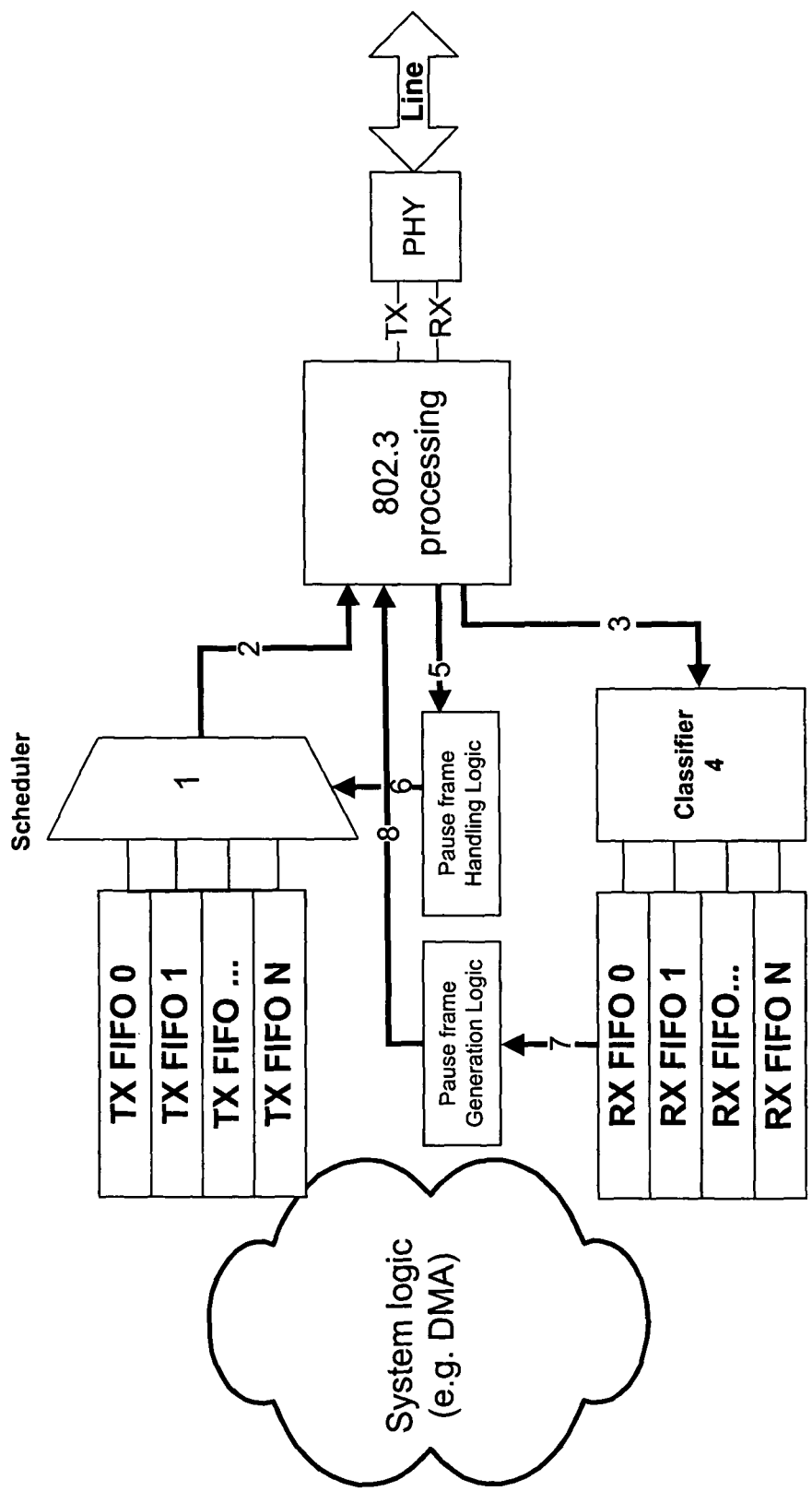
FIG. 3 is block diagram of an embodiment of the invention.

FIG. 3 is a block diagram of an embodiment of the invention. System logic is coupled to sets of multiple Tx and Rx FIFOs. A scheduler has inputs coupled to Tx FIFOs and an output coupled to the 802.3 processing element. Pause Frame generation logic has control inputs coupled to the Rx FIFOs and a pause frame output coupled to the 802.3 processing element and Pause Frame handling logic has a Pause Frame input coupled to the 802.3 processing element and a control output coupled to the scheduler. The 802.3 processing element has Tx and Rx ports coupled to the PHY.

In this embodiment, the reserved field of the standard 802.3x Pause Frame is utilized to identify a particular virtual stream to be paused. Two bytes are used to define the virtual stream map [16 virtual streams] and two bytes define the spaces left for max sized messages per virtual stream [total of 16×2=32 bytes]. Rest of the 8 bytes are reserved for future use.

This information can be encoded by assigning a bit position in the reserved field to each virtual stream, e.g., a particular Rx FIFO in a receiver and Tx FIFO in a transmitter that are exchanging information, and the setting of a bit in one of the bit positions identifies the particular Tx FIFO in the set of Tx FIFOs that is to be paused.

The operation of the embodiment depicted in FIG. 3 will now be described. The operation of the PFGL to generate a flow-aware pause frame (FAPF) will be described with reference to FIG. 4 and the operation of the PFHL to handle received FAPF will be described with reference to FIG. 5.

Figure 4:
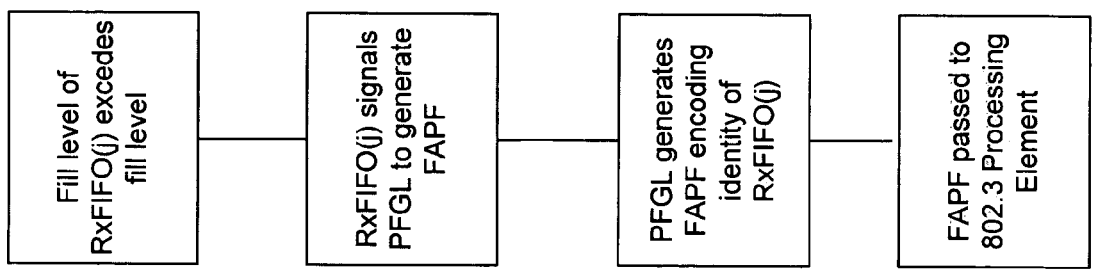

In FIG. 4, if the fill level of a particular Rx FIFO, in this example Rx FIFO 1, exceeds the programmable threshold then a Flow-Aware Pause Frame is generated encoding the programmable pause time and having the bit position identifying Rx FIFO 1 in the reserved field of the Pause Frame set by the Pause Frame generation logic. The FAPF is then passed to the 802.3 processing element for transmission.

Figure 5:
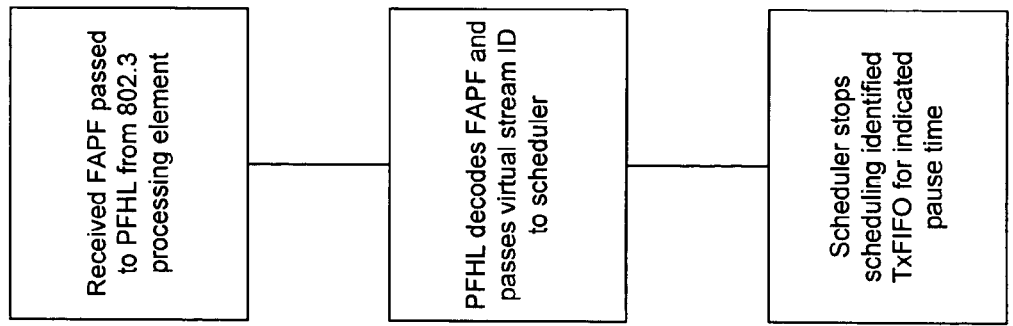
FIGS. 4 and 5 are flow charts of actions performed by embodiments of the invention.

In FIG. 5, when a FAPF is received by the 802.3 processing element, it is passed to the PFHL which reads the pause time and virtual stream identification information from the Pause Frame. The pause time and virtual stream identification information are sent from the PFHL to the Scheduler. The Scheduler stops scheduling the identified Tx FIFO for transmission for the amount of time indicated by the pause time.

If during negotiation, either Link Level Auto negotiation or software initiated negotiation, an Ethernet device determines that the link partner does not support this modification, it will default to standard Ethernet flow control mechanism. This allows for support for off-the-shelf Ethernet devices.

Overall, 4 working configurations and their performance would be:
1. TX Standard MAC—RX Standard MAC-> HOL blocking can occur. No traffic class differentiation.
2. TX Standard MAC—RX enhanced MAC-> HOL blocking can occur. No traffic class differentiation.
3. TX enhanced MAC—RX standard MAC-> HOL blocking can occur. No traffic class differentiation.
4. TX enhanced MAC—RX enhanced MAC-> Full traffic class differentiation.

However, when all link partners use Enhanced MAC, there are significant benefits to overall architecture as congestion information of one flow is fed back from the congestion point to the sources and helps relieve congestion by selectively backing-off only sources belonging to a particular virtual stream. The Pause Frame Handling Logic at the transmitter decodes the identity of the virtual stream requesting a pause and the scheduler PAUSEes all TxFIFOs belonging to the identified virtual stream.

In another embodiment of the invention utilizes Reserved Code Words to interrupt a frame being transmitted to immediately transmit a Pause Frame. In a standard Ethernet system the transmission of the Pause Frame is delayed until the transmission of the current frame is completed. This could lead to overflow of the Rx buffer that requested the Pause Frame.

In this embodiment, SERDES, SGMII and/or TBI reserved K-codes in the 8 b/10 b encoded PMD/PCS sub-layer are used to interrupt the packet being transmitted and insert the modified standard PAUSE frame or a specially defined PAUSE frame. A description of 8 b/10 b encoding in K codes is given in an article by Z. X. Widmer and P. A. Franaszek entitled A DC-BALANCED, PARTITIONED-BLOCK, 8 B/10 B TRANSMISSION CODE, IBM Journal of Research and Development, Vol. 27, Number 5, September 1983.

Since the flow control message can be inserted by the receiver and received by the transmitter as soon as congestion is detected at the receiver, that is there is no need to wait for frame boundary, the buffering requirements per virtual stream can be reduced thereby reducing the turnaround time from the transmission of the pause frame to actual pause of the transmission from the virtual stream.

Referring back to FIG. 3, when an RxFIFO overflows the Pause Frame Generation Logic triggers the PHY to interrupt the packet being transmitted and to transmit a K-code that indicates to the transmitter that the current frame is being aborted and that the next packets will comprise a PAUSE frame. Accordingly, the delay between the time the RxFIFO overflows and the time that the transmitter pauses the transmission of packets on the virtual stream is reduced.

The invention has now been described with reference to the preferred embodiments. Alternatives and substitutions will now be apparent to persons of skill in the art. For example, as is known in the art, the FIFO overflow condition can be defined in many ways. Further, virtual streams experiencing backpressure can be identified using different combinations of bit positions in the reserved fields of the Pause Frame. Also, the invention is not limited to systems in strict compliance with IEEE 802.3. Accordingly, it is not intended to limit the invention except as provided by the appended claims.

What is claimed is:

1. A method comprising:

identifying an overflow RxFIFO, included in a plurality of RxFIFOs, with the overflow RxFIFO having a fill level exceeding a threshold, with each RxFIFO in the plurality of RxFIFOs holding data of a corresponding virtual stream included in a receive group of virtual streams, and with an RxFIFO and a corresponding TxFIFO transferring data in a virtual stream, where the plurality of RxFIFOs are included in a first Ethernet device coupled to first and second link partners, where the overflow RxFIFO holds traffic of a first receive virtual stream included in the receive group of virtual streams and where the corresponding TxFIFO is located in the first link partner;

encoding bits in the reserved field of a first 802.3 flow-aware pause frame, using an 802.3 processing element, to identify the first receive virtual stream as the virtual stream to be paused by the first link partner;

transmitting the first flow-aware pause frame to only the first link partner utilizing the 802.3 processing element;

receiving, at the Ethernet device, a second flow-aware pause frame transmitted from the second link partner utilizing the 802.3 processing element;

decoding bits in the reserved field of the second flow-aware pause frame, using the 802.3 processing element, to identify a first transmit virtual stream included in a transmit group of virtual streams, with the Ethernet device including a plurality of TxFIFOs and with each TxFIFO corresponding to a virtual stream of the transmit group of virtual streams; and stopping scheduling of transmission of traffic from the TxFIFO in the Ethernet device corresponding to the first transmit virtual stream of the transmit group of virtual streams.

2. The method of claim 1 further comprising:

auto-negotiating to determine whether flow-aware pause frames are supported.

3. An Ethernet device comprising:

a plurality of RxFIFOs, with each RxFIFO in the plurality configured to hold data included in a corresponding virtual stream of a receive group of virtual streams, and with each RxFIFO and a corresponding TxFIFO transferring data in a virtual stream, with the Ethernet device configured to be coupled to first and second link partners and with the corresponding TxFIFO included in the first link partner;

a pause frame generation logic block configured to encode bits in the reserved field of an 802.3 pause frame identifying an overflow RxFIFO having a fill level exceeding a threshold;

an 802.3 processing unit, coupled to the pause frame generation logic block, configured to transmit the flow-aware pause frame only to the first link partner;

a plurality of TxFIFOs configured to hold virtual streams in a transmit group of virtual streams at the transmitter;

with the 802.3 processing unit configured to receive a flow-aware pause frame;

a scheduler, coupled to the plurality of TxFIFOs, configured to schedule transmission of data from one of the TxFIFOs; and a pause frame handling logic block, coupled to the scheduler, configured to decode bits in the reserved field of a received flow-aware pause frame to identify a particular virtual stream in the transmit group of virtual streams, with each virtual stream of the transmit group of virtual streams corresponding to a TxFIFO in the plurality and with the pause frame handling block configured to signal the scheduler to stop transmitting frames from the TxFIFO corresponding to the particular virtual stream of the transmit group of virtual streams.

4. A system comprising:

means for identifying an overflow RxFIFO, included in a plurality of RxFIFOs, with the overflow RxFIFO having a fill level exceeding a threshold, with each RxFIFO in the plurality of RxFIFOs holding data of a corresponding virtual stream included in a receive group of virtual streams, and with an RxFIFO and a corresponding TxFIFO transferring data in a virtual stream, where the plurality of RxFIFOs are included in a first Ethernet device coupled to first and second link partners, where the overflow RxFIFO holds traffic of a first receive virtual stream included in the receive group of virtual streams and where the corresponding TxFIFO is located in the first link partner;

means for encoding bits in the reserved field of a first 802.3 flow-aware pause frame, using an 802.3 processing element, to identify the first receive virtual stream as the virtual stream to be paused by the first link partner;

means for transmitting the first flow-aware pause frame to only the first link partner utilizing the 802.3 processing element;

means for receiving, at the Ethernet device, a second flow-aware pause frame transmitted from the second link partner utilizing the 802.3 processing element;

means for decoding bits in the reserved field of the second flow-aware pause frame, using the 802.3 processing element, to identify a first transmit virtual stream included in a transmit group of virtual streams, with the Ethernet device including a plurality of TxFIFOs and with each TxFIFO corresponding to a virtual stream of the transmit group of virtual streams; and means for stopping scheduling of transmission of traffic from the TxFIFO corresponding to the first transmit virtual stream of the transmit group of virtual streams.

5. The system of claim 4 further comprising:
means for auto-negotiating to determine whether flow-aware pause frames are supported.

6. An Ethernet device comprising:
a plurality of RxFIFOs, with each RxFIFO in the plurality configured to hold data included in a corresponding virtual stream of a receive group of virtual streams, and with each RxFIFO and a corresponding TxFIFO transferring data in a virtual stream, with the Ethernet device configured to be coupled to a first link partner and with the corresponding TxFIFO included in the first link partner;
a pause frame generation logic block configured to encode bits in the reserved field of an 802.3 flow-aware pause frame identifying an overflow RxFIFO having a fill level exceeding a threshold; and
an 802.3 processing unit, coupled to the pause frame generation logic block, configured to transmit the flow-aware pause frame only to the first link partner.

7. An Ethernet device comprising:
a plurality of TxFIFOs configured to hold virtual streams in a transmit group of virtual streams at the transmitter;
an 802.3 processing unit configured to receive a flow-aware pause frame;
a scheduler, coupled to the plurality of TxFIFOs, configured to schedule transmission of data from one of the TxFIFOs; and
a pause frame handling logic block, coupled to the scheduler, configured to decode bits in the reserved field of a received flow-aware pause frame to identify a particular virtual stream in the transmit group of virtual streams, with each virtual stream of the transmit group of virtual streams corresponding to a TxFIFO in the plurality and with the pause frame handling block configured to signal the scheduler to stop transmitting frames from the TxFIFO corresponding to the particular virtual stream of the transmit group of virtual streams.

* * * * *